United States Patent
Alvarez et al.

[15] 3,659,105
[45] Apr. 25, 1972

[54] SUBATOMIC PARTICLE DETECTOR WITH LIQUID ELECTRON MULTIPLICATION MEDIUM

[72] Inventors: Luis W. Alvarez; Stephen E. Derenzo; Richard A. Muller, all of Berkeley; Robert G. Smits, Lafayette; Haim Zaklad, Berkeley, all of Calif.

[73] Assignee: The United States of America as represented by the United States Atomic Energy Commission

[22] Filed: Oct. 21, 1970

[21] Appl. No.: 82,653

[52] U.S. Cl. .................. 250/83.6 R, 250/71.5 R, 250/83.1, 250/83.3 R, 313/61 D
[51] Int. Cl. ........................................ G01t 1/18, H01j 39/26
[58] Field of Search .................. 250/83.6 R, 71.5 R, 83.3 R, 250/83.1; 313/61 D

[56] References Cited

UNITED STATES PATENTS 3,337,734   8/1967   Chubb..............................250/83.6 R Primary Examiner—Morton J. Frome
Attorney—Roland A. Anderson

[57] ABSTRACT

A subatomic particle detector having a large number of equally spaced anode conductors arranged in a single plane opposite and parallel to a large cathode plate with the space between the anode conductors and cathode plate filled with liquid argon. A phototransistor is connected to each conductor for automatic readout of the detector by means of a laser beam that is scanned over each phototransistor.

11 Claims, 7 Drawing Figures

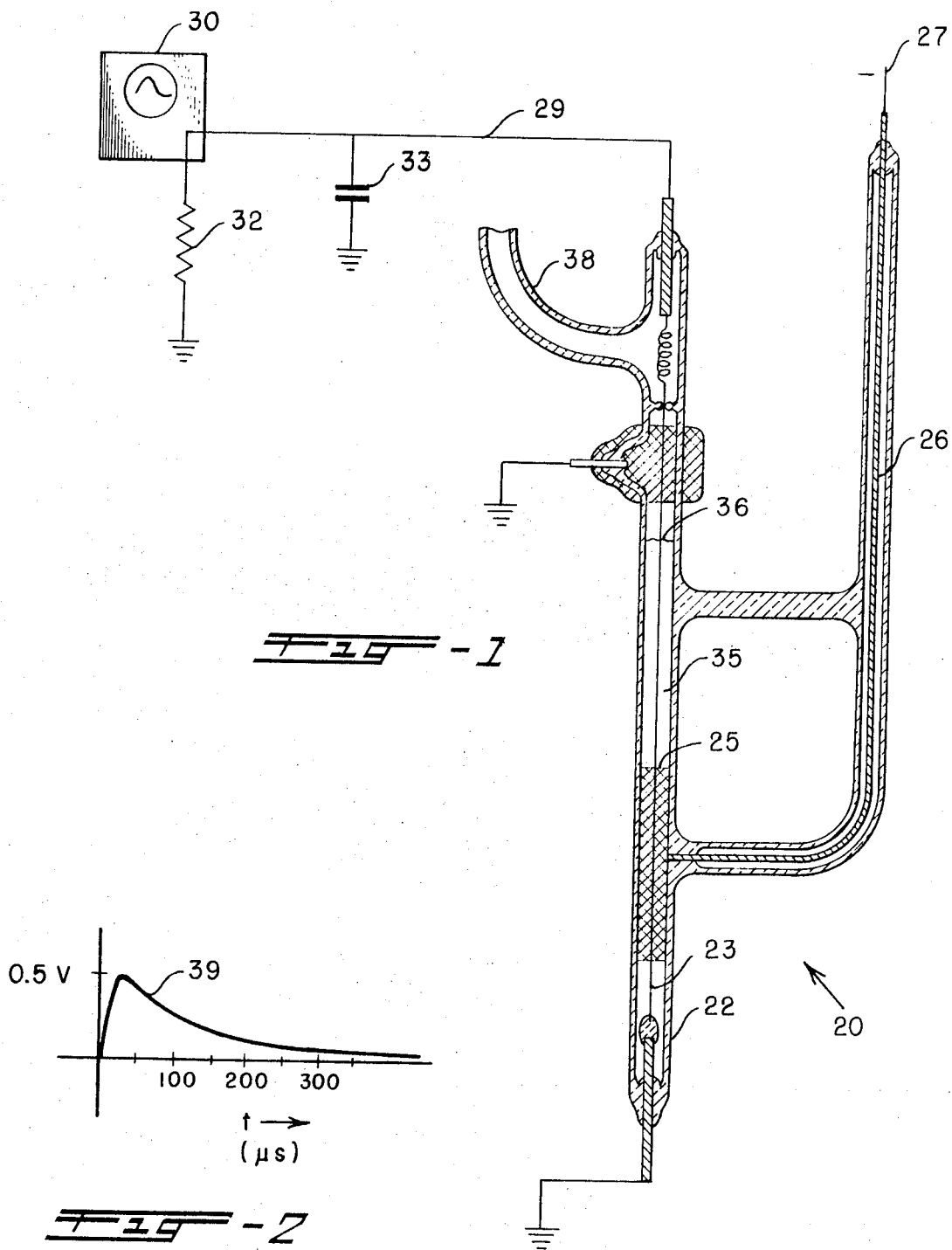

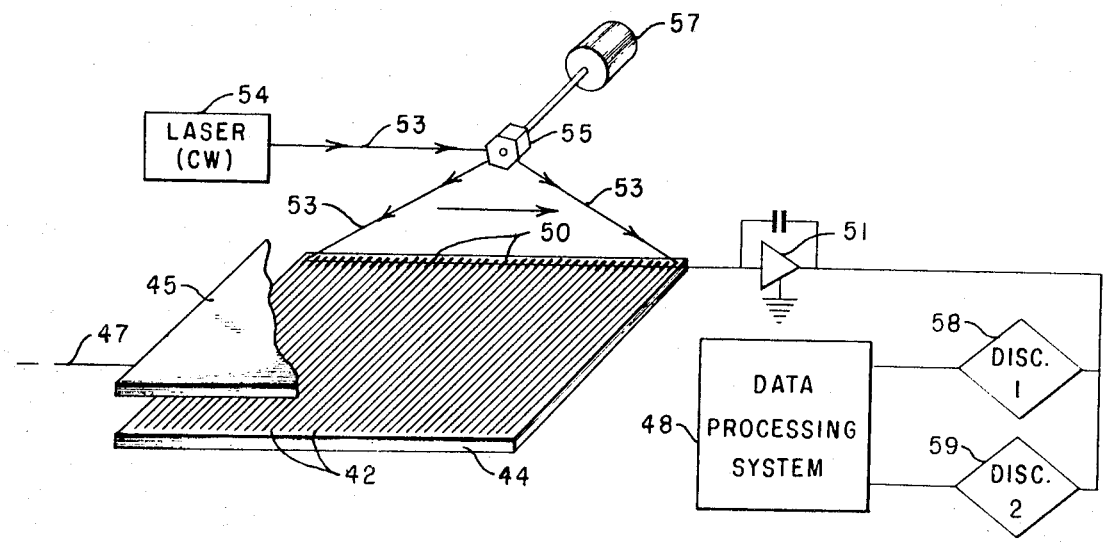
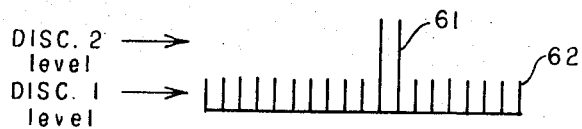
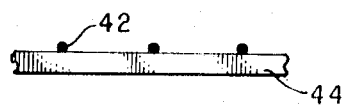 
 
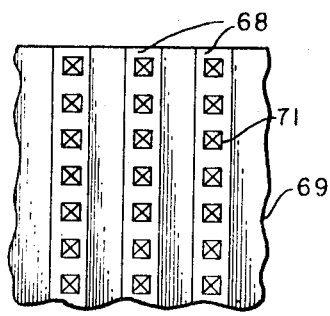
INVENTORS
LUIS W. ALVAREZ
STEPHEN E. DERENZO
BY RICHARD A. MULLER
ROBERT G. SMITS
HAIM ZAKLAD
ATTORNEY:

SUBATOMIC PARTICLE DETECTOR WITH LIQUID ELECTRON MULTIPLICATION MEDIUM

BACKGROUND OF INVENTION

The present invention relates to subatomic particle detectors and more particularly it relates to a filmless detector that provides high spatial resolution and automatic readout.

A widely used filmless subatomic particle detector which is adaptable to automatic readout is the gas-filled wire chamber. These chambers, however, lack the spatial resolution necessary to interpret the results of experiments being carried out at increasingly higher energies. It has been found that regardless of how close the wires in such a chamber are spaced, the center of a track in the chamber cannot be determined with an rms error of less than $\epsilon \approx 0.2 \tan \theta + 0.2$, where $\epsilon$ is in mm and $\theta$ is the angle of the track with respect to the chamber normal.

SUMMARY OF INVENTION

In brief, the present invention pertains to a subatomic particle detector that has a cathode having a large surface area separated a very small distance from an anode having a relatively small surface area, with the space between the anode and cathode filled with a liquid having high electron mobility as an electron multiplication medium.

It is an object of the invention to detect the paths of subatomic particles with a high degree of spatial resolution and to automatically readout the results of the detection.

Another object is to use a liquid having high electron mobility as an electron multiplication medium in a particle detector.

Another object is to eliminate spark discharges in a particle detector having closely spaced electrodes.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

FIG. 1 is a cross-sectional view of a liquid-filled ionization chamber with typical electrical connections, according to the invention.

FIG. 2 is a typical waveform of an output signal from the chamber of FIG. 1.

FIG. 3 is a schematic diagram of a multiwire particle detector including a readout system using a phototransistor connected to each wire and a laser beam for scanning the phototransistors.

FIG. 4 is a pulse diagram showing the difference in height between pulses from the phototransistors of FIG. 3 under normal conditions and phototransistors connected to wires adjacent to an ionized region.

FIG. 5 is an expanded partial end view of a first construction of an anode for the detector of FIG. 3.

FIG. 6 is an expanded partial end view of a second construction of an anode for the detector of FIG. 3.

FIG. 7 is a partial top view of a third construction of an anode for the detector of FIG. 3.

DESCRIPTION OF AN EMBODIMENT

Referring to the drawing there is shown in FIG. 1 a detector 20 for detecting subatomic particles. The detector 20 is comprised of glass tubing 22 with an elongated conductor in the form of a fine electrically conducting wire anode 23 stretched between the ends of the tubing. A portion of the wire anode extends through and is coaxial with a cylindrical cathode 25 which is situated on the inner surface of the glass tubing and is electrically connected over a high-voltage lead 26 to the negative pole of a voltage source 27. The upper end of the wire anode is connected over a lead 29 to an oscilloscope 30 having an input impedance 32. The total parasitic capacitance of the detector 20 is indicated as a capacitance 33. The tubing 22 defines a chamber 35 which is filled with a noble gas such as xenon or argon in the gaseous state through a filling arm 38. The tubing 22 is mounted in a refrigerated chamber (not shown) so that the noble gas is condensed to provide a liquid 36 in the tubing.

In operation, the detector is placed in the path of a radioactive source. Passage of a particle through the chamber 35 in the space between the anode and cathode ionizes the liquid gas atoms along the path of the particle. The voltage applied to the cathode 25 is maintained at a level that will supply the free electrons resulting from the ionization with sufficient energy to make inelastic collisions with the liquid gas atoms and to cause electron multiplication by an exponential avalanche of electrons toward the anode. However, the voltage applied across the anode and cathode is maintained below the level that would cause field emission from the cathode to anode and lead to a spark discharge. Typically, for a detector using liquid argon and having a fine wire anode from 4–20 $\mu$m in diameter and separated 2 mm from the cathode, the counting threshold was found to be around 5,200 V and the spark discharge threshold to be around 6,200 V. As a result of the avalanche a pulse is developed on the lead 29; a typical 50 pico-coulomb pulse 39 is shown in FIG. 2. Pulse height, however, has been found to be sensitive to the liquid pressure and tends to decrease with an increase in pressure.

In order to obtain electron multiplication in a liquid, it has been found necessary to maintain a high degree of electron mobility which in general is inhibited by the presence of impurities in the liquid. In liquid argon for example, the presence of liquid oxygen as an impurity tends to capture the free electrons. The purity necessary for liquid argon has been found to be less than 1 part of oxygen impurities per million parts of argon. This degree of purity for liquid argon has been obtained by condensing gaseous argon from a supply that has been purified by passing it through an active metal getter. High electron mobility is essential for avalanche multiplication and is known to be present only in one class of liquids: the noble gases.

Referring to FIG. 3, there is shown an example of a multianode array particle detector 41 suitable for determining the path of an ionizing particle with a high degree of resolution. The detector 41 is comprised of a plurality elongated conductors in the form of fine anode wires 42 mounted on a flat support 44 with a cathode plate 45 spaced from the wires and arranged to be parallel thereto. The space between the wires and plate is filled with a liquid having high electron mobility. A negative pole 47 of a voltage source is connected to the cathode plate 45.

Upon passage of a particle through the detector, the liquid is ionized along the path of the particle and a charge induced in adjacent wires 42. In order to readout and record the particle path, each of the wires may be successively connected to a data processing system 48. Such connection may be by means of successively actuated electronic switches such as used in the system shown in FIG. 3 wherein a phototransistor 50 is connected to one end of each of the wires 42. The emitter of each phototransistor 50 is connected to the associated wire 42 while the collectors are connected together in common to the input of an amplifier 51. The phototransistors 50 are available in arrays on integrated circuit chips which may be arranged on the support 44 with the photosensitive laser exposed for scanning by a laser beam 53 from a laser 54. The beam 53 is rotated over the transistors by means of a multifaced reflector 55 which is rotated by a motor 57. As the beam falls on each phototransistor base, the phototransistor is biased to conduct a charge on the associated wire to the amplifier 51. Each wire adjacent the path of the particle has been charged by an electron avalanche and therefore conducts a relatively large charge through the associated phototransistor to the amplifier, resulting in a relatively large pulse 61 (FIG. 4) at the amplifier output. Each of the phototransistors not associated with a charge wire develops a low level pulse 62 at the amplifier output. The pulses 62 are due to a small photovoltaic emf induced in each phototransistor upon its base being exposed to the laser beam.

The pulses at the output of discriminator 58 are applied to the data processing system 48 for indexing the system with respect to the scanning of the wires 42. The pulses at the output of the discriminator 59 are also applied to the system 48. A coincidence of pulses from discriminators 58 and 59 indicates the position of a charged wire with respect to the scanning of wires 42. The system 48 includes storage means that stores this information for indicating the position of the particle path. In a practical particle detection system a second anode and cathode (not shown) would be required to fully define the particle path. The second anode and cathode would have to separate connection to the system 48 and would be oriented parallel to the first anode and cathode with the two sets of anode conductors at right angles.

Various arrangements of elongated conductors that may be used as the anode are shown in FIG. 5, 6, and 7. In FIG. 5 a partial end view of the wire conductors 42 are shown mounted on the support 44. In FIG. 6, half-cylindrical conductors 65 are shown bonded to a support 66. It is convenient to fabricate the half-cylindrical conductors 65 by first plating thin strips of metal on the support 66 using thin film technique and then plating more metal on the strips to obtain the half-cylindrical form. In FIG. 7 elongated conductors 68 are shown mounted on a support 69. A multitude of protrusions 71 extend from each of the conductors 68. Conveniently, the protrusions may be in the form of pyramids having square bases. Such conductors have been developed by Stanford Research Institute, Menlo Park, California and have been fabricated to have pyramids 1/1,000 inch high on 1/1,000 inch centers.

It has been found that a liquid particle detector with a very smooth cathode and a large number of small protrusions extending from the anode enhance the sensitivity of the detector to produce electron multiplication without sparking. This is due to electric field concentrations obtained at the tips of the protrusions. The sensitivity of any particular anode-cathode configuration to electron multiplication may be referred to as an enhancement factor which may be defined as the ratio of the field emission threshold voltage with a negative potential applied to the cathode to the field emission threshold voltage with a negative potential applied to the anode. For detectors using purified liquid argon, enhancement factors of at least 110 have been found to be required for practical detector operation. Thus, when using the wires 42 and half-cylinders 65, it is desirable to give their surface a fine roughness such as by etching to provide a large number of field concentration points. With the conductors 68, the pyramids 71 provide field concentrations points whose location and height are precisely controlled.

For a more complete discussion of the development and theoretical aspects of the invention reference is made to a U.S. Atomic Energy Commission technical report No. UCRL–19254 "The Prospect of High Spatial Resolution For Counter Experiments: A New Particle Detector Using Electron Multiplication in Liquid Argon," by Derenzo, Muller, Smits and Alvarez.

While an embodiment of the invention has been shown and described, further embodiments or combinations of those described herein will be apparent to those skilled in the art without departing from the spirit of the invention.

We claim:
1. A particle detector, comprising:
an anode;
a cathode spaced from said anode and having a substantially larger surface area than said anode;
a liquid filling the space between anode and cathode, said liquid having high electron mobility; and
means for applying a voltage across said anode and cathode, said voltage being applied to hold said anode positive with respect to said cathode, the level of said voltage and relative surface areas of said cathode and anode being arranged to give a field strength between said anode and cathode that will sustain an ionization avalanche in said liquid in response to passage of an ionizing particle through said liquid, which field is below the strength required for field emission from said cathode to said anode.

2. The particle detector of claim 1, wherein said liquid is a liquid noble gas.

3. The particle detector of claim 2, wherein said liquid is argon and has a purity of less than 1 part of impurities per million parts of argon.

4. The particle detector of claim 1, wherein said anode is an elongated electrical conductor having a multitude of electrically conducting protrusions extending therefrom.

5. The particle detector of claim 4, wherein each of said protrusions is a pyramid having a square base.

6. The particle detector of claim 1, wherein said anode is comprised of a plurality of elongated conductors and said cathode is a conductor having a continuous surface.

7. The particle detector of claim 6, wherein said conductors are fine wires.

8. The particle detector of claim 6, wherein said conductors are semi-cylindrical and are integral with a dielectric sheet.

9. The particle detector of claim 6, further including:
data processing means; and
means for successively connecting each of said elongated conductors to said data processing means to record the path of said ionizing particle.

10. The particle detector of claim 6, further including:
light responsive means connected to said plurality of conductors;
means for scanning a light beam over said light responsive means for generating first signals in said light responsive means that correspond to said conductors being adjacent a normal region of said liquid and for generating second signals in said light responsive means that are different from said first signals and which correspond to said conductors being adjacent an ionized region of said liquid; and
means responsive to said first and second signals for storing and indicating the position of said conductors adjacent an ionized region of said liquid.

11. The particle detector of claim 1, wherein said liquid is xenon.

* * * * *